(12) United States Patent
Mroz

(10) Patent No.: US 10,944,993 B2
(45) Date of Patent: Mar. 9, 2021

(54) VIDEO DEVICE AND NETWORK QUALITY EVALUATION/DIAGNOSTIC TOOL

(71) Applicant: Carrier Corporation, Palm Beach Gardens, FL (US)

(72) Inventor: Sylwester Mroz, Pomerania (PL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/416,630

(22) Filed: May 20, 2019

(65) Prior Publication Data

US 2019/0364300 A1 Nov. 28, 2019

(30) Foreign Application Priority Data

May 25, 2018 (EP) .................................... 18174393

(51) Int. Cl.
*H04N 19/66* (2014.01)
*H04N 19/172* (2014.01)
*H04N 19/169* (2014.01)

(52) U.S. Cl.
CPC .......... *H04N 19/66* (2014.11); *H04N 19/172* (2014.11); *H04N 19/188* (2014.11)

(58) Field of Classification Search
CPC .... H04N 19/66; H04N 19/172; H04N 19/188; H04N 21/2402; H04N 21/44209; H04N 17/004
USPC .................................................... 375/240.27
See application file for complete search history.

(56) References Cited

U.S. PATENT DOCUMENTS

| | | |
|---|---|---|
| 7,649,938 B2 | 1/2010 | Chen et al. |
| 7,936,916 B2 | 5/2011 | Zhang et al. |
| 8,027,264 B2 | 9/2011 | Ermna et al. |
| 8,953,038 B2 | 2/2015 | Lu et al. |
| 9,325,951 B2 | 4/2016 | Saptharishi |
| 9,497,450 B2 | 11/2016 | Yu et al. |
| 2007/0268836 A1 | 11/2007 | Byun et al. |

(Continued)

FOREIGN PATENT DOCUMENTS

| | | |
|---|---|---|
| CN | 101572829 B | 2/2011 |
| CN | 103731643 A | 4/2014 |

(Continued)

OTHER PUBLICATIONS

Extended European Search Report for Application No. 18174393.1; Report dated Nov. 7, 2018; 29 pages.

(Continued)

*Primary Examiner* — Allen C Wong
(74) *Attorney, Agent, or Firm* — Cantor Colburn LLP

(57) ABSTRACT

A method of evaluating the quality of a video network is provided. The method including: collecting a first plurality of video frames leaving a video capture device, the first plurality of video frames being transmitted from the video capture device to a video encoder; collecting a second plurality of video frames arriving at the video encoder, the second plurality of video frames being transmitted from the video capture device to the video encoder; comparing the first plurality of video frames and the second plurality of video frames; and determining a fault with the video capture device or the video encoder in response to the comparison of the first plurality of video frames and the second plurality of video frames.

16 Claims, 4 Drawing Sheets

(56) References Cited

U.S. PATENT DOCUMENTS

| | | | |
|---|---|---|---|
| 2007/0280296 A1 | 12/2007 | Suzuki et al. | |
| 2009/0040303 A1 | 2/2009 | Finn et al. | |
| 2012/0201310 A1 | 8/2012 | Yamagishi et al. | |
| 2012/0307074 A1 | 12/2012 | Bhagavathy et al. | |
| 2013/0259123 A1* | 10/2013 | Schweid .......... | H04N 21/23412 |
| | | | 375/240.12 |
| 2015/0052571 A1* | 2/2015 | Stokking .......... | H04N 21/23418 |
| | | | 725/116 |
| 2015/0281748 A1 | 10/2015 | Guo et al. | |
| 2017/0064309 A1* | 3/2017 | Sethuraman ......... | H04N 19/127 |
| 2018/0184143 A1* | 6/2018 | Davis ............... | H04N 21/23608 |

FOREIGN PATENT DOCUMENTS

| | | |
|---|---|---|
| CN | 106888376 A | 6/2017 |
| WO | 2013029214 A1 | 3/2013 |
| WO | 2014114109 A1 | 7/2014 |
| WO | 2016076841 A1 | 5/2016 |

OTHER PUBLICATIONS

Series G: Transmission Systems and Media, Digital Systems and Networks; Multimedia Quality of Service and Performance—Generic and User-related Aspects; "Perfomance Monitoring Points for IPTV"; ITU-T—Telecommunication Standardization Sector of ITU; G.1081; Oct. 22, 2008; 1-14 pages.

* cited by examiner

VIDEO DEVICE AND NETWORK QUALITY EVALUATION/DIAGNOSTIC TOOL

CROSS-REFERENCE TO RELATED APPLICATIONS

This application claims the benefit of European Patent Application No. 18174393.1 filed May 25, 2018, which is incorporated herein by reference in its entirety.

BACKGROUND

The subject matter disclosed herein generally relates to the field of video networks, and more particularly to an apparatus and method for evaluating and diagnosing video networks.

Existing systems and tools may create difficulties for network administrators regarding proper configuration and evaluation of the local area network (LAN) capacity for the video surveillance systems. Improper configuration and evaluation of LAN capacity may lead to poor performance and quality of the video surveillance system.

BRIEF SUMMARY

According to one embodiment, a method of evaluating the quality of a video network is provided. The method including: collecting a first plurality of video frames leaving a video capture device, the first plurality of video frames being transmitted from the video capture device to a video encoder; collecting a second plurality of video frames arriving at the video encoder, the second plurality of video frames being transmitted from the video capture device to the video encoder; comparing the first plurality of video frames and the second plurality of video frames; and determining a fault with the video capture device or the video encoder in response to the comparison of the first plurality of video frames and the second plurality of video frames.

In addition to one or more of the features described above, or as an alternative, further embodiments may include: collecting a first plurality of video packets leaving a video encoder, the first plurality of packets being transmitted from the video encoder to a video viewing device; collecting a second plurality of video packets arriving at the video viewing device, the second plurality of video packets being transmitted from the video encoder to the video viewing device; comparing the first plurality of video packets and the second plurality of video packets; and determining a fault with the video encoder or the video viewing device in response to the comparison of the first plurality of video packets and the second plurality of video packets.

In addition to one or more of the features described above, or as an alternative, further embodiments may include: collecting a third plurality of video frames leaving a video encoder, the third plurality of video frames being transmitted from the video encoder to a video viewing device; collecting a fourth plurality of video frames arriving at the video viewing device, the fourth plurality of video frames being transmitted from the video encoder to the video viewing device; comparing the third plurality of video frames and the fourth plurality of video frames; and determining a fault with the video encoder or the video viewing device in response to the comparison of the third plurality of video frames and the fourth plurality of video frames.

In addition to one or more of the features described above, or as an alternative, further embodiments may include that comparing the first plurality of video frames and the second plurality of video frames further includes: determining a video frame lost ratio between the video capture device and the video encoder in response the first plurality of video frames and the second plurality of video frames.

In addition to one or more of the features described above, or as an alternative, further embodiments may include that comparing the first plurality of video packets and the second plurality of video packets further includes: determining a video packet lost ratio between the video encoder and the video viewing device in response the first plurality of video packets and the second plurality of video packets.

In addition to one or more of the features described above, or as an alternative, further embodiments may include that comparing the first plurality of video frames and the second plurality of video frames further includes: determining a bandwidth of the first plurality of video frames and a bandwidth of the second plurality of video frames; and comparing the bandwidth of the first plurality of video frames and the bandwidth of the second plurality of video frames, the bandwidth of the first plurality of video frames and the bandwidth of the second plurality of video frames is an effective bandwidth or an instantaneous bandwidth.

In addition to one or more of the features described above, or as an alternative, further embodiments may include that comparing the first plurality of video packets and the second plurality of video packets further includes: determining a bandwidth of the first plurality of video packets and a bandwidth of the second plurality of video packets; and comparing the bandwidth of the first plurality of video packets and the bandwidth of the second plurality of video packets, the bandwidth of the first plurality of video packets and the bandwidth of the second plurality of video packets is an effective bandwidth or an instantaneous bandwidth.

In addition to one or more of the features described above, or as an alternative, further embodiments may include that comparing the first plurality of video frames and the second plurality of video frames further includes: determining a size of each of the first plurality of video frames and a size each of the second plurality of video frames; and comparing the size of each the first plurality of video frames and the size of each of the second plurality of video frames.

In addition to one or more of the features described above, or as an alternative, further embodiments may include that comparing the first plurality of video packets and the second plurality of video packets further includes: determining a statistical description of differences between I-frames of the first plurality of video packets and I-frames of the second plurality of video packets.

In addition to one or more of the features described above, or as an alternative, further embodiments may include that comparing the first plurality of video packets and the second plurality of video packets further includes: determining a statistical description of differences between P-frames of the first plurality of video packets and P-frames of the second plurality of video packets.

In addition to one or more of the features described above, or as an alternative, further embodiments may include that comparing the first plurality of video packets and the second plurality of video packets further includes: determining a statistical description of differences between P-frames of the first plurality of video packets and P-frames of the second plurality of video packets.

In addition to one or more of the features described above, or as an alternative, further embodiments may include that comparing the first plurality of video frames and the second plurality of video frames further includes: determining a time dispersion of each of the first plurality of video frames and a time dispersion of each of the second plurality of video frames; and comparing the time dispersion of each the first plurality of video frames and the time dispersion of each of the second plurality of video frames.

According to another embodiment, a method of evaluating the quality of a video network is provided. The method including: collecting a first plurality of video packets leaving a video encoder, the first plurality of packets being transmitted from the video encoder to a video viewing device; collecting a second plurality of video packets arriving at the video viewing device, the second plurality of video packets being transmitted from the video encoder to the video viewing device; comparing the first plurality of video packets and the second plurality of video packets; and determining a fault with the video encoder or the video viewing device in response to the comparison of the first plurality of video packets and the second plurality of video packets.

In addition to one or more of the features described above, or as an alternative, further embodiments may include that comparing the first plurality of video packets and the second plurality of video packets further includes: determining a video packet lost ratio between the video encoder and the video viewing device in response the first plurality of video packets and the second plurality of video packets.

In addition to one or more of the features described above, or as an alternative, further embodiments may include that comparing the first plurality of video packets and the second plurality of video packets further includes: determining a bandwidth of the first plurality of video packets and a bandwidth of the second plurality of video packets; and comparing the bandwidth of the first plurality of video packets and the bandwidth of the second plurality of video packets, the bandwidth of the first plurality of video packets and the bandwidth of the second plurality of video packets is an effective bandwidth or an instantaneous bandwidth.

In addition to one or more of the features described above, or as an alternative, further embodiments may include that comparing the first plurality of video packets and the second plurality of video packets further includes: determining a statistical description of differences between I-frames of the first plurality of video packets and I-frames of the second plurality of video packets.

In addition to one or more of the features described above, or as an alternative, further embodiments may include that comparing the first plurality of video packets and the second plurality of video packets further includes: determining a statistical description of differences between P-frames of the first plurality of video packets and P-frames of the second plurality of video packets.

According to another embodiment, a method of evaluating the quality of a video network is provided. The method including: collecting a first plurality of video frames leaving a video encoder, the first plurality of video frames being transmitted from the video encoder to a video viewing device; collecting a second plurality of video frames arriving at the video viewing device, the second plurality of video frames being transmitted from the video encoder to the video viewing device; comparing the first plurality of video frames and the second plurality of video frames; and determining a fault with the video encoder or the video viewing device in response to the comparison of the first plurality of video frames and the second plurality of video frames.

In addition to one or more of the features described above, or as an alternative, further embodiments may include that comparing the first plurality of video frames and the second plurality of video frames further includes: determining a video frame lost ratio between the encoder and the video viewing device in response the first plurality of video frames and the second plurality of video frames.

In addition to one or more of the features described above, or as an alternative, further embodiments may include that comparing the first plurality of video frames and the second plurality of video frames further includes: determining a bandwidth of the first plurality of video frames and a bandwidth of the second plurality of video frames; and comparing the bandwidth of the first plurality of video frames and the bandwidth of the second plurality of video frames, the bandwidth of the first plurality of video frames and the bandwidth of the second plurality of video frames is an effective bandwidth or an instantaneous bandwidth.

Technical effects of embodiments of the present disclosure include comparing video data entering and leaving nodes of a video network in order to determine locations of faults.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Existing systems and tools may create difficulties for network administrators regarding proper configuration and evaluation of the local area network (LAN) capacity for the video surveillance systems. The difficulties may be due to the fact that the instantaneous bandwidth taken by the video data of one video channel streamed from the particular video device may fluctuate in a very large scale. Regardless of the video device bandwidth parameters configuration like constant bit rate, the average bandwidth taken by the stream considering the time window 10 ms, 330 ms and 1 second can vary up to hundreds of times. Instantaneous bandwidth (e.g., while transmitting the I video frame) may depend on the scene and its dynamism in front of the video encoder; effectiveness of the encoder, intelligent mechanisms built in into the encoder that predict the compression factors and exactness for next frames encoding process to keep the average bandwidth at a nominal level; and stability and constancy of the video device's network packet shipping mechanisms.

The task to evaluate the network capacity in given circumstances is becoming more complicated for hundreds of video streams (where the interference of Intra-frame shipments is of importance) and while having configured and used multi-streaming video devices (where the time dispersion of sending packets that belong to one video frame is of importance as many video streams are sharing the same network device/card on the video device transmitter side). Embodiments disclosed herein seek to address these concerns to evaluate and diagnose the video device and network quality.

Figure 1:
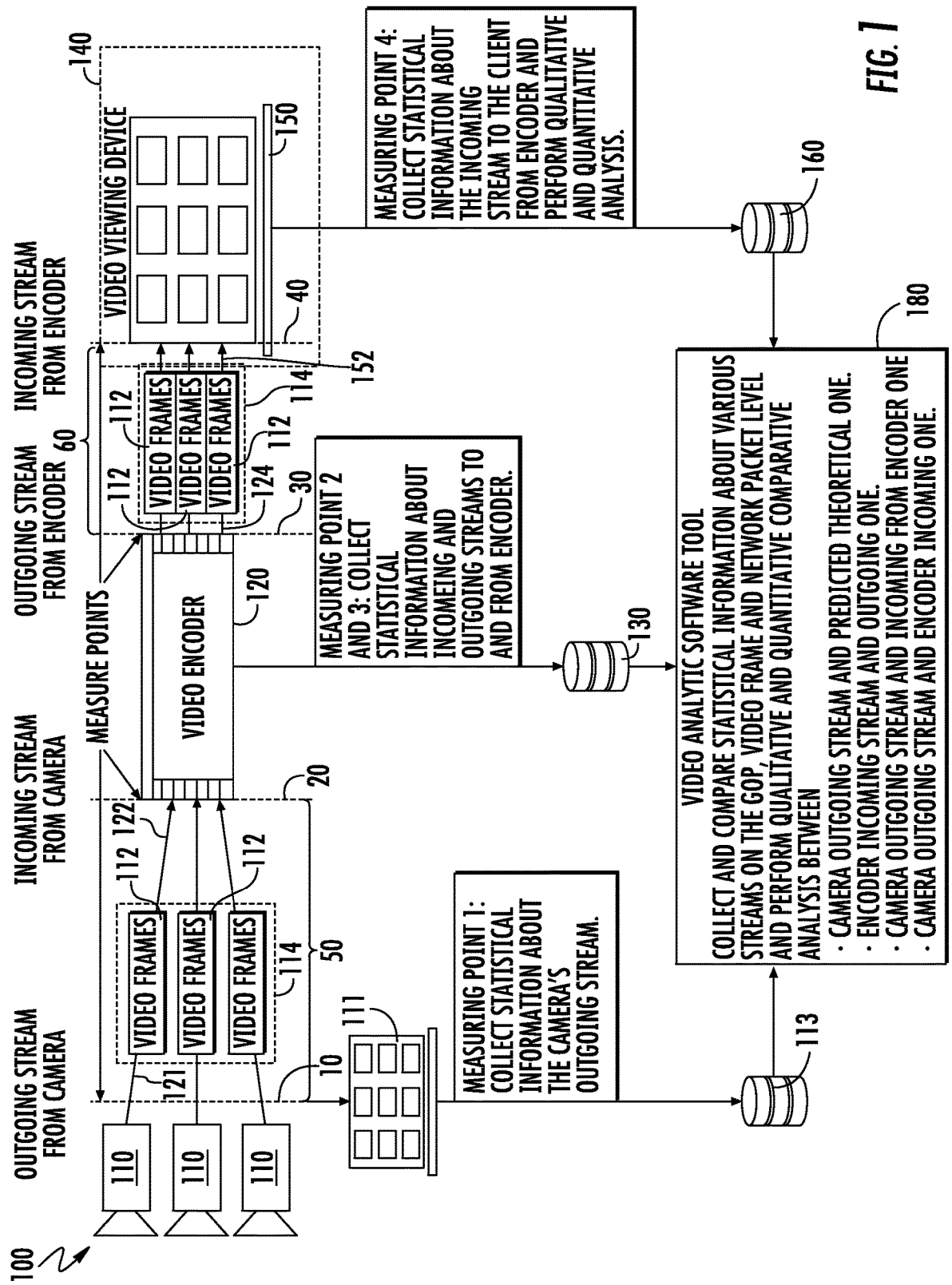
FIG. 1 illustrates a general schematic system diagram of a video network, in accordance with an embodiment of the disclosure.

FIG. 1 schematically illustrates a video network 100, which generally may include one or more video capture devices 110 (e.g., video camera), a video encoder 120 in communication with each of the one or more video capture devices 110, a local video capture database 113, a local video database 130, a video viewing device 150, and a local client database 130. The video capture devices 110 captures video frames 112 and transmits the video frames 112 to the video encoder 120 and local video capture database 113. The video frames 112 from one or more video capture devices 110 arrive at the video encoder 120 as an incoming stream 122. The video frames 112 are organized into packets 114 by the video encoder 120. Alternatively, the video capture device 110 may divide the video frames 112 into packets 114. The packets 114 contain information such as, for example, an IP address from where the packets 114 are coming from, an IP address where to send the packets 114, a type of the video frame 112, and a number of packets 114. The packets 114 are then pushed into a queue (e.g., first in first out (FIFO) queue) to be sent into a network 140. When ripe in the queue, the packets 114 are sent out into the network 140 to a video viewing device 150. The video viewing device 150 may be a computing device, such as, for example a desktop computer, laptop computer, smart phone, smart watch, or similar device known to one of skill in the art. The packets 114 are received at the video viewing device 150 as an incoming stream 152 and the video viewing device contains a decoder (not shown) configured to receive the packets 114 and collapse the packets 114 into video frames 112 to be sent to a display, which then displays the video frames received.

A video analytics software tool 180 may be installed within the video network 100. The video analytics software tool 180 may be installed directly on at least one of the video capture devices 110, the video encoder 120, and the video viewing device 150. Alternatively, the video analytics software tool 180 may be remotely connected to at least one of the video capture devices 110, the video encoder 120, and the video viewing device 150. In an embodiment, the video analytics software tool 180 is installed directly on the video encoder 120 and the video viewing device 150.

The video analytics software tool 180 is configured to collect and analyze video frames 112 at four different measurement points 10, 20, 30, 40. At a first measurement point 10, the video analytics software tool 180 is configured to collect video frames 112 and/or video packets 114 captured by the video capture device 112 in an outgoing stream 121 from the video capture device 112. The video frames 112 and/or video packets 114 collected in the outgoing stream 121 from the video capture device 112 may be stored in the local database 113. In order to collect video frames 112 and/or video packets 114 captured by the video capture device 112, the video analytics software tool 180 may be directly connected to the video capture device 112 (i.e., there is no active network equipment between the video capture device 112 and the first measurement point 10). The video analytics software tool 180 collects statistical information about the video frames 112 in the outgoing stream 121 from the video capture device 112. The statistical information about the video stream 121 at the first measurement point 10 enables the video analytics software tool 180 to perform the qualitative and quantitative analysis of the video capture device 112 itself in comparison to the predicted and theoretical information about video frames in an outgoing stream from an ideal video capture device. The first measurement point 10 allows for a comparative analysis between real values like a FPS, group of pictures (GOP), bandwidth and theoretical values set on the video capture device 112.

At a second measurement point 20, the video analytics software tool 180 is configured to collect video frames 112 and/or video packets 114 transmitted from the video capture device 112 and received by the video encoder 120 in an incoming stream 122 of the video encoder 120. The video frames 112 and/or video packets 114 collected in the incoming stream 122 of the video encoder 120 may be stored in the local database 130. The incoming stream 122 of the video encoder 120 may include the LAN/WAN network active devices. The video analytics software tool 180 collects statistical information about the video frames 112 in the incoming stream 122 of the video encoder 120. The statistical information about the video stream 122 at the second measurement point 20 enables the video analytics software tool 180 to perform the qualitative and quantitative analysis of the network path 50 between the video capture device 112 and the video encoder 120. The second measurement point 20 allows for a comparative analysis of the path 50 between the video capture device 112 and the video encoder 120 to detect issues on that path 50 such as, for example, a delay between sent GOPs, video frames 112, and network packets. Also, there is a validation to get to know how many packets 114, video frames 112, and GOPs were lost on that path.

At a third measurement point 30, the video analytics software tool 180 is configured to collect video frames 112 and/or video packets 114 transmitted from the video encoder 120 in an outgoing stream 124 of the video encoder 120. The video frames 112 and/or video packets 114 collected in the outgoing stream 124 of the video encoder 120 may be stored in the local database 130. In order to collect video frames 112 and/or video packets 114 going through the video encoder 120, the video analytics software tool 180 may be directly connected to the video encoder 120 (i.e., there is no active network equipment between the video encoder 120 and the third measurement point 30). The video analytics software tool 180 collects statistical information about the video frames 112 and/or video packets 114 going through the video encoder 120. The statistical information about the video stream 122 at the third measurement point 30 enables the video analytics software tool 180 to perform the qualitative and quantitative analysis of the video encoder 120 to determine if the video encoder 120 work is working correctly. The third measurement point 30 allows for a comparative analysis of the path 50 between the incoming stream 122 of the video encoder 120 and the outgoing stream 124 of the video encoder 120. The third measurement point 30 answers the question: Is an issue (a delay, time dispersion influence, packet/video frame lost) in the video encoder 120 itself. The third measurement point 30 also provides comparative analysis of the quality of the streams between the outgoing stream 124 of the video capture device 110 and the outgoing stream 124 of the video encoder 120. Additionally, the third measurement point 30 delivers information regarding whether any delay is introduced to the stream 124 to make the video smoother or to reduce/even the bandwidth.

At a fourth measurement point 40, the video analytics software tool 180 is configured to collect video frames 112 and/or video packets 114 transmitted from the video encoder 120 and received by the video viewing device 150 in an incoming stream 152 of the video viewing device 150. The video frames 112 and/or video packets 114 collected in the incoming stream 152 of the video viewing device 150 may be stored in the local database 160. The incoming stream 152 of the video viewing device 150 may include the LAN/WAN network active devices. The video analytics software tool 180 collects statistical information about the video frames 112 in the incoming stream 152 of the video viewing device 150. The statistical information about the video stream 152 at the fourth measurement point 40 enables the video analytics software tool 180 to perform the qualitative and quantitative analysis of the network path 60 between the video encoder 120 and the video viewing device 150. The fourth measurement point 40 allows for a comparative analysis of the path 60 between the video encoder 120 and the video viewing device 150 to detect issues on that path 50 such as, for example, a delay between sent GOPs, video frames 112, and network packets 114. Also, there is a validation to get to know how many packets 114, video frames 112, and GOPs were lost on that path.

As discussed above, the video frames 112 and/or video packets 114 may be collected and stored at each measurement point 10, 20, 30, 40 on local data bases 113, 130, 160. The local databases 113, 130, 60 may be a storage device such as, for example, a random access memory (RAM), read only memory (ROM), or other electronic, optical, magnetic or any other computer readable medium. The video capture device 110 may include a processor or may be operably connected to a secondary computing device 111 having a processor capable of writing to the local database 113. The video encoder 120 may include a processor capable of writing to the local database 130. The video viewing device 150 may include a processor capable of writing to the local database 160. Each processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously.

The video analytics software tool 180 is configured to analyze both the data contained in each local database 113, 130, 160. During the analysis, the video analytics software tool 180 is configured to measure effective bandwidth and instantaneous bandwidth, while considering asynchronous interference of dozens and hundreds of video streams as an average value for a configurable time window such as, for example, 1 ms, 5 ms, 10 ms, 330 ms (equivalent of 1GOP encoder) 1 s. The video analytics software tool 180 is also configured to visualize the effective bandwidth and instantaneous bandwidth. The effective bandwidth is calculated for the packets 114. It is calculated by factor of how much data was received in the specific time window. The instantaneous bandwidth is calculated by a factor of a size of video frame 112 divided by time of how long that frame 112 was received.

Additionally, during the analysis, the video analytics software tool 180 is configured to measure the "time dispersion between video frames 112" to check if the video is smooth.

The video analytics software tool 180 is also configured to measure a size of the video frames 112 and statistical description of differences between I and P-frames of the packets 114 for the given encoder parameters and the dynamism of the scene in front of the video capture device 110. The video analytics software tool 180 is also configured to visualize the size of the video frames 112 and statistical description of differences between I and P-frames of the packets 114

The video analytics software tool 180 is configured to determine a network packet lost ratio and a video frame lost ratio as the video frames 112 and packets 114 are transmitted from the video capture device 110 to the video encoder 120 to video viewing device 150. The video frame lost ratio may be determined by comparing the video frames 112 leaving the video capture device 110 at the first measurement point 10 to the video frames 112 arriving at the video encoder 120 at the second measurement point 20. The network packet lost ratio may be determined by comparing the packets 114 leaving the video encoder 110 at the third measurement point 30 to packets 114 arriving at the video viewing device 150 at the fourth measurement point 40.

The network packet lost ratio may also be calculated in a real-time transport protocol (RTP) stream situation. In an RTP stream situation, the packets 114 are numbered and that information is stored in the RTP header (application layer in the network packet layer). Each next packet 114 has a sequence number about one bigger than a predecessor packet 114, thus a value of how many packets should be received by the video viewing device 150 and how many packets 114 were lost in actual video stream may be determined.

Advantageously by determining a packet lost ratio and a video frame lost ratio, a statistical description of the quality of the received video stream on the video viewing device 150 is provided while considering that one network packet lost for the Intra-frame may cause the whole set of frames (e.g. the whole GOP) to be impossible to decode.

The video analytics software tool 180 is configured to measure and analyze the time dispersion of whole video frames 112 at the outgoing stream 121 of the video capture device 110 observed at the first measurement point 10 (e.g., that may be caused by the video device multiplexing mechanism) versus the time dispersion observed at incoming stream 122 of the video capture device 110 observed at the second measurement point 20 (e.g., caused by the network infrastructure on the path of the video frame 112) versus the time dispersion expected at the video viewing device 150 based on the mathematical prediction based on the frame per second expected from video channels of the video capture devices 110.

The video analytics software tool 180 is also configured to measure and analyze other real video channel parameters of the video capture devices 110 including but not limited to a real frame per second (FPS) value and a real GOP value, which is a count of the frames between two I-frames including a first count tacking which I-frames sent by a video encoder device 120 are real. Sometimes when a video capture devices 110, such as a cameras is subjected to high stress (e.g., when the camera looks at a static scene but that scene is dramatically changed) the camera can start transmitting a new I-Frame to produce a better video quality instead of the rest of the P-Frames and in this scenario the real GOP is lower than configured on the camera. In a high stress scenario, sometimes I-frames are changed to P-frames because the camera is trying not exceed the bandwidth and in this scenario the real GOP may be higher than configured on the camera.

Additionally, the video analytics software tool 180 is also configured to measure, analyze, and determine a statistical description of a variety of time parameters including: a time taken for sending one particular video frame; a time taken for sending all frames in one GOP; and a time between the last network packet of the predecessor frame and the last network packet of the successor frame. Each time parameter may be measured at the third measurement point 30 and the fourth measurement point, then compared.

Figure 2:
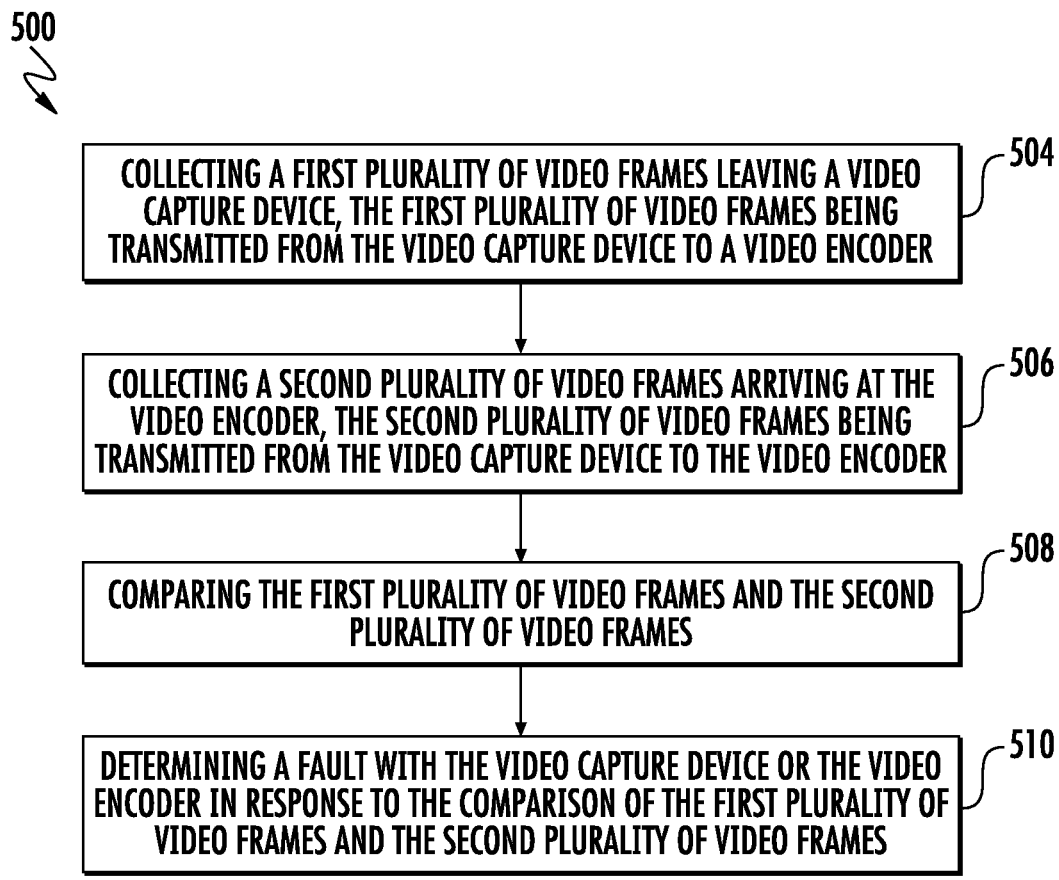
FIG. 2 is a flow diagram illustrating a method of evaluating the quality of a video network, according to an embodiment of the present disclosure.

Referring now to FIG. 2 with continued reference to FIG. 1. FIG. 2 shows a flow chart of method 500 of evaluating the quality of a video network 100. At block 504, a first plurality of video frames 112 leaving a video capture device 110 is collected at a first measurement point 10. The first plurality of video frames 112 are transmitted from the video capture device 110 to a video encoder 120. At block 506, a second plurality of video frames 112 arriving at the video encoder 120 is collected at a second measurement point 20. The second plurality of video frames 112 are transmitted from the video capture device 110 to the video encoder 120.

At block 508, the first plurality of video frames 112 and the second plurality of video frames 112 are compared. The first plurality of video frames 112 and the second plurality of video frames 112 may be compared by determining a video frame lost ratio between the video capture device 110 and the video encoder 120 in response the first plurality of video frames 112 and the second plurality of video frames 112. The first plurality of video frames 112 and the second plurality of video frames 112 may also be compared by: determining a bandwidth of the first plurality of video frames 112 and a bandwidth of the second plurality of video frames 112; and comparing the bandwidth of the first plurality of video frames 112 and the bandwidth of the second plurality of video frames 112. The bandwidth of the first plurality of video frames 112 and the bandwidth of the second plurality of video frames 112 may be an effective bandwidth or an instantaneous bandwidth. The first plurality of video frames 112 and the second plurality of video frames 112 may also be compared by determining a size of each of the first plurality of video frames 112 and a size each of the second plurality of video frames 112; and comparing the size of each the first plurality of video frames 112 and the size of each of the second plurality of video frames 112. Additionally, the first plurality of video frames 112 and the second plurality of video frames 112 may be compared by: determining a time dispersion of each of the first plurality of video frames 112 and a time dispersion of each of the second plurality of video frames 112; and comparing the time dispersion of each the first plurality of video frames 112 and the time dispersion of each of the second plurality of video frames 112.

At block 510, a fault with the video capture device 110 or the video encoder 120 is determined in response to the comparison of the first plurality of video frames 112 and the second plurality of video frames 112.

Figure 3:
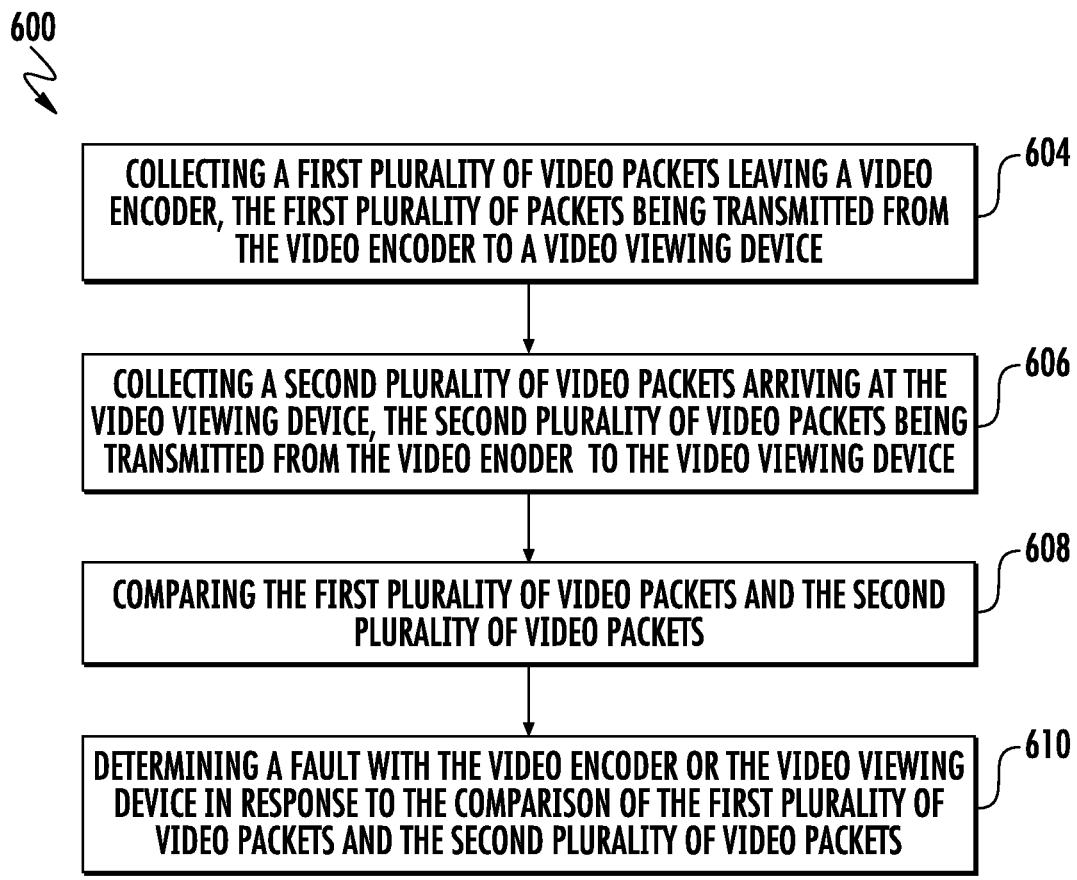
FIG. 3 is a flow diagram illustrating a method of evaluating the quality of a video network, according to an embodiment of the present disclosure.

Referring now to FIG. 3 with continued reference to FIG. 1. FIG. 3 shows a flow chart of method 600 of evaluating the quality of a video network 100. Method 600 may be performed separately or in combination with method 500. At block 604, a first plurality of video packets 114 leaving a video encoder 120 is collected at the third measurement point 30. The first plurality of packets 114 being transmitted from the video encoder 120 to a video viewing device 150 at the fourth measurement point 40. At block 606, a second plurality of video packets 114 arriving at the video viewing device 150 is collected at the fourth measurement point 40. The second plurality of video packets 114 being transmitted from the video encoder 120 to a video viewing device 150.

At block 608, the first plurality of video packets 114 and the second plurality of video packets 114 are compared. The first plurality of video packets 114 and the second plurality of video packets 114 may be compared by determining a video packet lost ratio between the video encoder 120 and the video viewing device 150 in response the first plurality of video packets 114 and the second plurality of video packets 114. The first plurality of video packets 114 and the second plurality of video packets 114 may also be compared by: determining a bandwidth of the first plurality of video packets 114 and a bandwidth of the second plurality of video packets 114; and comparing the bandwidth of the first plurality of video packets 114 and the bandwidth of the second plurality of video packets 114. The bandwidth of the first plurality of video packets 114 and the bandwidth of the second plurality of video packets 114 may be an effective bandwidth or an instantaneous bandwidth. Additionally, the first plurality of video packets 114 and the second plurality of video packets 114 may be compared by: determining a statistical description of differences between I-frames 112 of the first plurality of video packets 114 and I-frames 112 of the second plurality of video packets 114 and/or determining a statistical description of differences between P-frames 112 of the first plurality of video packets 114 and P-frames 112 of the second plurality of video packets 114.

At block 610, a fault with the video encoder 120 or the video viewing device 150 is determined in response to the comparison of the first plurality of video packets 114 and the second plurality of video packets 114.

Figure 4:
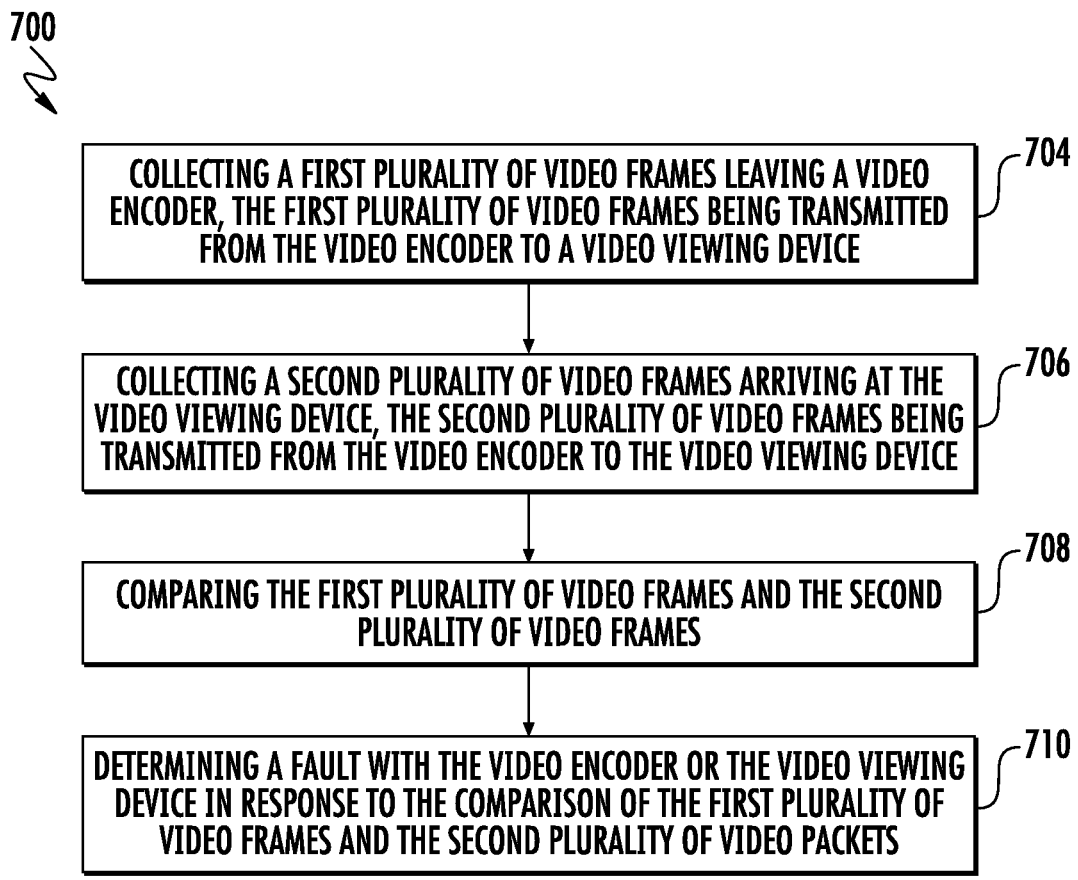
FIG. 4 is a flow diagram illustrating a method of evaluating the quality of a video network, according to an embodiment of the present disclosure.

Referring now to FIG. 4 with continued reference to FIG. 1. FIG. 2 shows a flow chart of method 700 of evaluating the quality of a video network 100. At block 704, a first plurality of video frames 112 leaving a video encoder 120 is collected at a third measurement point 30. The first plurality of video frames 112 are transmitted from the video encoder 120 to a video viewing device 150. At block 706, a second plurality of video frames 112 arriving at the video viewing device 150 is collected at a fourth measurement point 40. The second plurality of video frames 112 are transmitted from the video encoder 120 to the video viewing device 150.

At block 708, the first plurality of video frames 112 and the second plurality of video frames 112 are compared. The first plurality of video frames 112 and the second plurality of video frames 112 may be compared by determining a video frame lost ratio between the video encoder 120 and the video viewing device 150 in response the first plurality of video frames 112 and the second plurality of video frames 112. The first plurality of video frames 112 and the second plurality of video frames 112 may also be compared by: determining a bandwidth of the first plurality of video frames 112 and a bandwidth of the second plurality of video frames 112; and comparing the bandwidth of the first plurality of video frames 112 and the bandwidth of the second plurality of video frames 112. The bandwidth of the first plurality of video frames 112 and the bandwidth of the second plurality of video frames 112 may be an effective bandwidth or an instantaneous bandwidth. The first plurality of video frames 112 and the second plurality of video frames 112 may also be compared by determining a size of each of the first plurality of video frames 112 and a size each of the second plurality of video frames 112; and comparing the size of each the first plurality of video frames 112 and the size of each of the second plurality of video frames 112. Additionally, the first plurality of video frames 112 and the second plurality of video frames 112 may be compared by: determining a time dispersion of each of the first plurality of video frames 112 and a time dispersion of each of the second plurality of video frames 112; and comparing the time dispersion of each the first plurality of video frames 112 and the time dispersion of each of the second plurality of video frames 112.

At block 710, a fault with the video encoder 120 or the video viewing device 150 is determined in response to the comparison of the first plurality of video frames 112 and the second plurality of video frames 112.

While the above description has described the flow processes of FIGS. 2, 3, and 4 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of evaluating quality of a video network, the method comprising:
   collecting a first plurality of video frames leaving a video capture device of the video network, the first plurality of video frames being transmitted from the video capture device to a video encoder of the video network;
   collecting a second plurality of video frames arriving at the video encoder, the second plurality of video frames being transmitted from the video capture device to the video encoder;
   comparing the first plurality of video frames and the second plurality of video frames; and
   determining, using a video analytics software tool, a fault with the video capture device or network path between the video capture device and the video encoder in response to the comparison of the first plurality of video frames and the second plurality of video frames,
   wherein the video analytics software tool is directly connected to the video capture device, and
   wherein comparing the first plurality of video frames and the second plurality of video frames further comprises:
   determining a video frame lost ratio between the video capture device and the video encoder in response the first plurality of video frames and the second plurality of video frames.

2. The method of claim 1, further comprising:
   collecting a first plurality of video packets leaving the video encoder, the first plurality of packets being transmitted from the video encoder to a video viewing device of the video network;
   collecting a second plurality of video packets arriving at the video viewing device, the second plurality of video packets being transmitted from the video encoder to the video viewing device;
   comparing the first plurality of video packets and the second plurality of video packets; and
   determining a fault along a network path between the video encoder and the video viewing device in response to the comparison of the first plurality of video packets and the second plurality of video packets.

3. The method of claim 2, wherein comparing the first plurality of video packets and the second plurality of video packets further comprises:
   determining a bandwidth of the first plurality of video packets and a bandwidth of the second plurality of video packets; and
   comparing the bandwidth of the first plurality of video packets and the bandwidth of the second plurality of video packets,
   wherein the bandwidth of the first plurality of video packets and the bandwidth of the second plurality of video packets is an effective bandwidth or an instantaneous bandwidth.

4. The method of claim 2, wherein comparing the first plurality of video packets and the second plurality of video packets further comprises:
   determining a statistical description of differences between I-frames of the first plurality of video packets and I-frames of the second plurality of video packets.

5. The method of claim 4, wherein comparing the first plurality of video packets and the second plurality of video packets further comprises:

determining a statistical description of differences between P-frames of the first plurality of video packets and P-frames of the second plurality of video packets.

6. The method of claim 2, wherein comparing the first plurality of video packets and the second plurality of video packets further comprises:
determining a statistical description of differences between P-frames of the first plurality of video packets and P-frames of the second plurality of video packets.

7. The method of claim 1, further comprising:
collecting a third plurality of video frames leaving the video encoder, the third plurality of video frames being transmitted from the video encoder to a video viewing device of the video network;
collecting a fourth plurality of video frames arriving at the video viewing device, the fourth plurality of video frames being transmitted from the video encoder to the video viewing device;
comparing the third plurality of video frames and the fourth plurality of video frames; and
determining a fault along a network path between the video encoder and the video viewing device in response to the comparison of the third plurality of video frames and the fourth plurality of video frames.

8. The method of claim 1, wherein comparing the first plurality of video frames and the second plurality of video frames further comprises:
determining a bandwidth of the first plurality of video frames and a bandwidth of the second plurality of video frames; and
comparing the bandwidth of the first plurality of video frames and the bandwidth of the second plurality of video frames,
wherein the bandwidth of the first plurality of video frames and the bandwidth of the second plurality of video frames is an effective bandwidth or an instantaneous bandwidth.

9. The method of claim 1, wherein comparing the first plurality of video frames and the second plurality of video frames further comprises:
determining a size of each of the first plurality of video frames and a size each of the second plurality of video frames; and
comparing the size of each the first plurality of video frames and the size of each of the second plurality of video frames.

10. The method of claim 1, wherein comparing the first plurality of video frames and the second plurality of video frames further comprises:
determining a time dispersion of each of the first plurality of video frames and a time dispersion of each of the second plurality of video frames; and
comparing the time dispersion of each the first plurality of video frames and the time dispersion of each of the second plurality of video frames.

11. A method of evaluating quality of a video network, the method comprising:
collecting a first plurality of video packets leaving a video encoder of the video network, the first plurality of packets being transmitted from the video encoder to a video viewing device of the video network;
collecting a second plurality of video packets arriving at the video viewing device, the second plurality of video packets being transmitted from the video encoder to the video viewing device;
comparing the first plurality of video packets and the second plurality of video packets; and
determining, using a video analytics software tool, a fault with the video viewing device or a network path between the video encoder and the video viewing device in response to the comparison of the first plurality of video packets and the second plurality of video packets, wherein the video analytics software tool is directly connected to the video encoder,
wherein comparing the first plurality of video packets and the second plurality of video packets further comprises:
determining a video packet lost ratio between the video encoder and the video viewing device in response the first plurality of video packets and the second plurality of video packets.

12. The method of claim 11, wherein comparing the first plurality of video packets and the second plurality of video packets further comprises:
determining a bandwidth of the first plurality of video packets and a bandwidth of the second plurality of video packets; and
comparing the bandwidth of the first plurality of video packets and the bandwidth of the second plurality of video packets,
wherein the bandwidth of the first plurality of video packets and the bandwidth of the second plurality of video packets is an effective bandwidth or an instantaneous bandwidth.

13. The method of claim 11, wherein comparing the first plurality of video packets and the second plurality of video packets further comprises:
determining a statistical description of differences between I-frames of the first plurality of video packets and I-frames of the second plurality of video packets.

14. The method of claim 11, wherein comparing the first plurality of video packets and the second plurality of video packets further comprises:
determining a statistical description of differences between P-frames of the first plurality of video packets and P-frames of the second plurality of video packets.

15. A method of evaluating quality of a video network, the method comprising:
collecting a first plurality of video frames leaving a video encoder of the video network, the first plurality of video frames being transmitted from the video encoder to a video viewing device of the video network;
collecting a second plurality of video frames arriving at the video viewing device, the second plurality of video frames being transmitted from the video encoder to the video viewing device;
comparing the first plurality of video frames and the second plurality of video frames; and
determining a fault with the video viewing device or a network path between the video encoder and the video viewing device in response to the comparison of the first plurality of video frames and the second plurality of video frames,
wherein comparing the first plurality of video frames and the second plurality of video frames further comprises:
determining a video frame lost ratio between the encoder and the video viewing device in response the first plurality of video frames and the second plurality of video frames, wherein a video analytics software tool is directly connected to the video encoder.

16. The method of claim 15, wherein comparing the first plurality of video frames and the second plurality of video frames further comprises:

determining a bandwidth of the first plurality of video frames and a bandwidth of the second plurality of video frames; and comparing the bandwidth of the first plurality of video frames and the bandwidth of the second plurality of video frames, wherein the bandwidth of the first plurality of video frames and the bandwidth of the second plurality of video frames is an effective bandwidth or an instantaneous bandwidth.

* * * * *